US009508115B2

(12) United States Patent
Hamann et al.

(10) Patent No.: US 9,508,115 B2
(45) Date of Patent: *Nov. 29, 2016

(54) LARGE-AREA MONITORING USING INFRARED IMAGING SYSTEM

(71) Applicant: International Business Machines Corporation, Armonk, NY (US)

(72) Inventors: Hendrik F. Hamann, Yorktown Heights, NY (US); Levente I. Klein, Tuckahoe, NY (US); Sergio A. Bermudez Rodriguez, Cronton on Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 396 days.

This patent is subject to a terminal disclaimer.

(21) Appl. No.: 13/833,150

(22) Filed: Mar. 15, 2013

(65) Prior Publication Data

US 2015/0161779 A1    Jun. 11, 2015

(51) Int. Cl.
*H04N 5/33* (2006.01)
*H04N 7/18* (2006.01)
*H04N 5/235* (2006.01)
*F24J 2/38* (2014.01)
(Continued)

(52) U.S. Cl.
CPC ........... *G06T 3/0043* (2013.01); *G06T 7/0004* (2013.01); *H04N 5/232* (2013.01); *H04N 5/23238* (2013.01); *H04N 5/33* (2013.01); *G02B 5/10* (2013.01); *G02B 13/06* (2013.01); *G02B 13/14* (2013.01); *G06T 2207/10016* (2013.01); *G06T 2207/10048* (2013.01); *G06T 2207/20224* (2013.01)

(58) Field of Classification Search
CPC ........................................................ H04N 5/33
USPC ........................................................ 348/164
See application file for complete search history.

(56) References Cited

U.S. PATENT DOCUMENTS 2,299,682 A  10/1942  Conant
4,626,905 A  12/1986  Schmidt
(Continued)

OTHER PUBLICATIONS

C.N. Long et al., "Retrieving Cloud Characteristics from Ground-Based Daytime Color All-Sky Images," Journal of Atmospheric and Oceanic Technology, vol. 23, May 2006.
(Continued)

*Primary Examiner* — Dave Czekaj
*Assistant Examiner* — Alison Slater
(74) *Attorney, Agent, or Firm* — Vazken Alexanian; Michael J. Chang, LLC

(57) ABSTRACT

An imaging system and use thereof for large-area monitoring with very high temporal resolution are provided. In one aspect, an imaging system includes a camera equipped with curved optics having a field of view of from about 0.01 miles to about 1.5 miles; and interchangeable light filters positioned in front of the camera configured to change one or more of an intensity and an amplitude of light captured by the imaging system. The curved optics may include a hemispherical mirror configured to reflect an image of objects in front of the mirror, and the camera may be positioned facing a reflective surface of the hemispherical mirror so as to capture the image reflected in the hemispherical mirror. Alternatively, the curved optics may include a fisheye lens mounted to the camera. An imaging network of the present imaging systems and a method for use thereof for thermal monitoring are also provided.

10 Claims, 10 Drawing Sheets

(51) Int. Cl.
*G02B 13/14* (2006.01)
*G02B 23/02* (2006.01)
*G06T 3/00* (2006.01)
*H04N 5/232* (2006.01)
*G06T 7/00* (2006.01)
*G02B 13/06* (2006.01)
*G02B 5/10* (2006.01)

(56) References Cited

U.S. PATENT DOCUMENTS

| | | | |
|---|---|---|---|
| 5,059,796 | A | 10/1991 | Nakamura |
| 6,847,497 | B2 | 1/2005 | Sogabe et al. |
| 7,260,241 | B2 | 8/2007 | Fukuhara et al. |
| 7,358,498 | B2 | 4/2008 | Geng et al. |
| 7,474,115 | B1* | 1/2009 | Trujillo ............ G09G 3/006 324/762.07 |
| 2004/0169770 | A1 | 9/2004 | Widener et al. |
| 2006/0023105 | A1* | 2/2006 | Kostrzewski ...... G06T 3/0018 348/335 |
| 2006/0092300 | A1 | 5/2006 | Tan et al. |
| 2006/0268231 | A1 | 11/2006 | Gil et al. |
| 2010/0201781 | A1 | 8/2010 | Trubko et al. |
| 2011/0041834 | A1 | 2/2011 | Liao |
| 2011/0205367 | A1* | 8/2011 | Brown ............... H04N 5/33 348/164 |
| 2012/0013996 | A1 | 1/2012 | Okumura |
| 2012/0050750 | A1* | 3/2012 | Hays .................. G01J 9/04 356/519 |
| 2013/0033616 | A1 | 2/2013 | Kaizu et al. |
| 2013/0034266 | A1* | 2/2013 | Shamir ............ G06K 9/6293 382/103 |
| 2013/0126706 | A1* | 5/2013 | Lynass .............. G01J 1/42 250/208.1 |

OTHER PUBLICATIONS

S. Mezouari et al., "Amplitude and phase filters for migration of defocus and third-order aberrations," Proceedings of the SPIE, vol. 5249, pp. 238-248 (Feb. 2004).

L. Berger et al., "Image Comparison from two cloud cover sensor in infrared and visible spectral regions," 21st International Conference on Interactive Information Processing Systems (IIPS) for Meteorology, Oceanography, and Hydrology, Session 9.2, Jan. 11, 2005.

J H Hwang et al., "Novel fire detection device for robotic fire fighting," 2010 International Conference on Control Automation and Systems (ICCAS), Oct. 27-30, 2010, pp. 96-100.

J. Galvao et al, "Microgeneration model in energy hybrid system—cogeneration and PV panels," 2010 International Symposium on Power Electronics Electrical Drives Automation and Motion (SPEEDAM), Jun. 14-16, 2010, pp. 1812-1817.

* cited by examiner

100

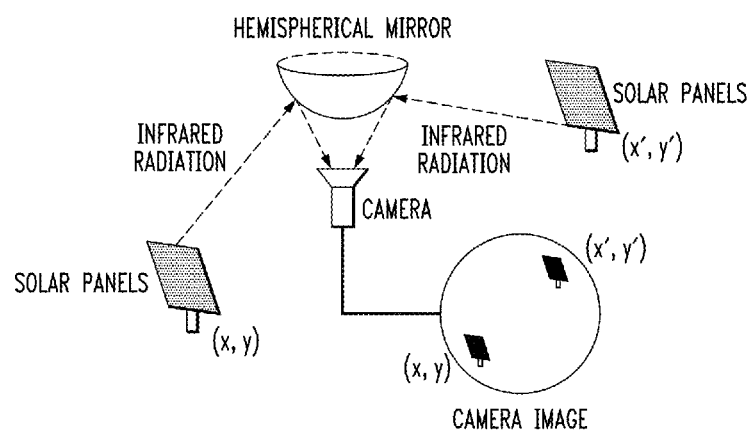
FIG. 5B
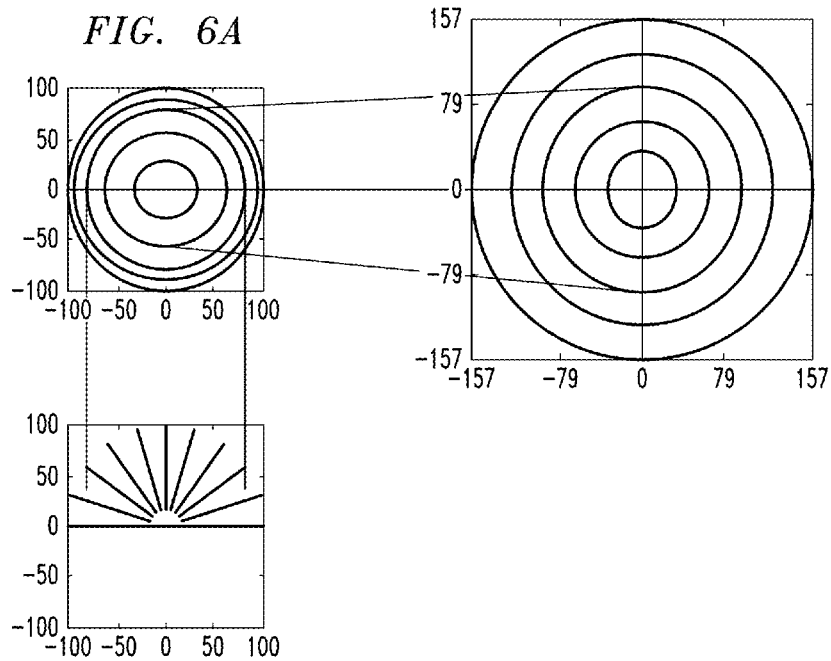
FIG. 6B
FIG. 6A
FIG. 6C

SUN BLOCKING STRIP

800

LARGE-AREA MONITORING USING INFRARED IMAGING SYSTEM

FIELD OF THE INVENTION

The present invention relates to thermal monitoring, and more particularly, to an (e.g., infrared) imaging system and use thereof for large-area monitoring with very high temporal resolution.

BACKGROUND OF THE INVENTION

Infrared imaging is used to locate cold or hot spots in commercial buildings, residential houses or to monitor heat variation of the information technology (IT) chip temperatures. Infrared imaging may be the easiest way to monitor the health and performance of large installations like solar farms where parts of the installation are not operating at the optimum levels. High temperatures (overheating) across a certain location(s) of a solar panel can indicate mechanical, electrical wiring, or photovoltaic performance shortcomings. Large scale temperature measurements are also becoming very valuable in agriculture where crop temperatures are direct indicators of the evapotranspiration processes and also of the vigor of the crops. Satellite or airborne imaging techniques may be used for these applications but they tend to be expensive and lack the spatial resolution (spatial pixel size tend to be 10 meters or higher). Furthermore, with satellite or airborne imaging the data will be acquired at large time intervals reducing the usefulness of techniques to identify and troubleshoot problems in real-time.

Another area where local temperature is important is with large scale solar installations where solar panels are mounted is a series-parallel configuration—such that a number of panels are mounted as a string in series to increase the voltage (e.g., greater than 600 VDC in the United States) and then the string of solar panels are mounted in parallel to increase the current.

In a solar system, solar panels strings coupled with inverters are used to collect and convert solar energy into electricity. Specifically, a central DC-AC inverter is used to convert the DC output from the solar panels into electricity. Many of the central inverters operate more efficiently at larger voltage and current inputs and this drives the solar panel connections to operate the inverters at their maximum performance.

In many situations, the performance of individual solar panels can be diminished due to mounting errors which will affect the performance of the whole panel string and thus reduce the overall system performance. Factors that affect individual solar panel performance can be solar sub-cell defects or wiring/interconnect issues that result in solar panel overheating. Once the temperature of a defective solar panel increases, the overall performance of the solar installation is reduced (i.e., the power produced decreases with increased panel temperature) as current flow through the strings of panels can be constrained or cut-off by a defective cell in the solar panel. Mounting/installation errors can also affect performance. For example, shadowing due to nearby structures leads to reduced voltage/current performance of solar panels.

Shadowing has more of an effect in the case of series mounted solar panel strings when the resistance of the solar panels is increased (the current drops) reducing the performance of the string of panels. Furthermore shadowing can result in voltage output fluctuations leading to unstable operation of inverters. Either solar panel overheating (increased temperature) or shadowing can result in reduced performance.

Thus, techniques for monitoring large scale solar installations in order to locate underperforming solar panels would be desirable.

SUMMARY OF THE INVENTION

The present invention provides an imaging system and use thereof for large-area monitoring with very high temporal resolution. In one aspect of the invention, an imaging system is provided. The imaging system includes a camera equipped with curved optics having a field of view of from about 0.01 miles to about 1.5 miles; and interchangeable light filters positioned in front of the camera configured to change one or more of an intensity and an amplitude of light captured by the imaging system. The curved optics may include a hemispherical mirror configured to reflect an image of objects in front of the mirror, and the camera may be positioned facing a reflective surface of the hemispherical mirror so as to capture the image reflected in the hemispherical mirror. Alternatively, the curved optics may include a fisheye lens mounted to the camera.

In another aspect of the invention, an imaging network is provided. The imaging system includes multiple imaging systems positioned in a geographical area, wherein each of the imaging systems includes a camera equipped with curved optics having a field of view of from about 0.01 miles to about 1.5 miles and interchangeable light filters positioned in front of the camera configured to change one or more of an intensity and an amplitude of light captured by the imaging system. The imaging systems may be positioned in the geographical area so as to have overlapping fields of view.

In yet another aspect of the invention, a method for thermal monitoring is provided. The method includes the following steps. A reference image of a geographical area is obtained at a time t using at least one imaging system. The imaging system includes a camera equipped with curved optics having a field of view of from about 0.01 miles to about 1.5 miles and interchangeable light filters positioned in front of the camera configured to change one or more of an intensity and an amplitude of light captured by the imaging system. One or more consecutive images of the geographical area are obtained at one or more times t+Δt using the at least one imaging system. The reference image is subtracted from the one or more consecutive images to identify one or more of the objects which exhibit a change in temperature between the time t and the one or more times t+Δt. The reference image and the consecutive images obtained by the imaging system are spherical images, and the method may further include the step of unfolding the reference image and the consecutive images from a spherical coordinate system to a flat Cartesian image.

A more complete understanding of the present invention, as well as further features and advantages of the present invention, will be obtained by reference to the following detailed description and drawings.

BRIEF DESCRIPTION OF THE DRAWINGS

FIG. 5B is a schematic diagram illustrating operation of the imaging system of FIG. 3 according to an embodiment of the present invention;

FIG. 6A is a diagram illustrating an image wherein concentric circles are used to show the way a hemispherical/fisheye lens image may be acquired by the present imaging systems having curved optics according to an embodiment of the present invention;

FIG. 6B is a diagram illustrating anchor points being used to unfold the image of FIG. 6A according to an embodiment of the present invention;

FIG. 6C is a diagram illustrating the unfolded image having an even distribution of concentric circles in the Cartesian coordinate across the whole image according to an embodiment of the present invention;

DETAILED DESCRIPTION OF PREFERRED EMBODIMENTS

Figure 1:
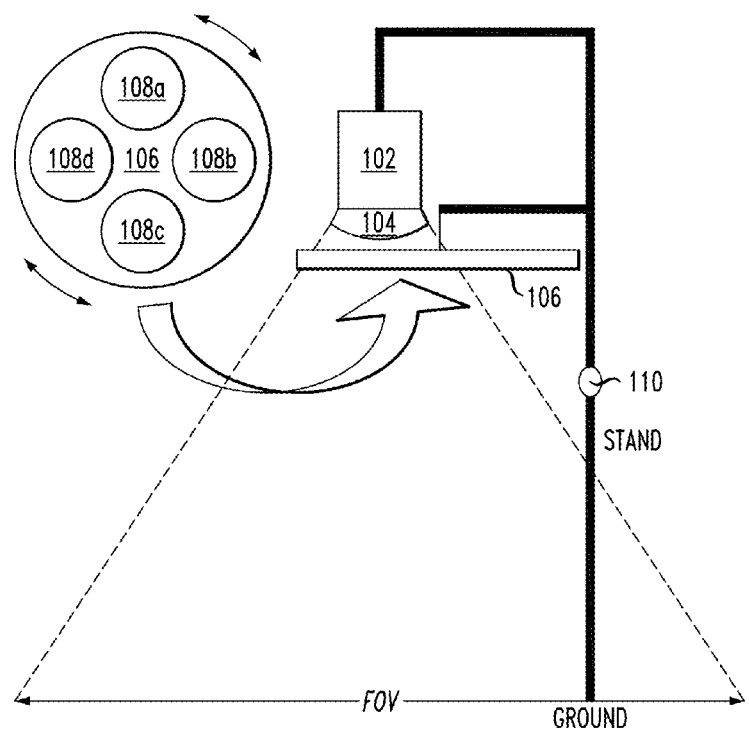
FIG. 1 is a diagram illustrating an exemplary imaging system having a curved optics imaging device that includes a (e.g., thermal) camera equipped with a fisheye lens according to an embodiment of the present invention.

Provided herein are imaging systems and techniques for use thereof in large-area monitoring. For large-scale solar installations, localizing the panels that are underperforming is challenging as any solution/monitoring system needs to have a large area coverage and enough angular resolution and sensitivity to pinpoint the locations where problems occur. Angular resolution is the smallest area on the curved surface that can be identified. Since it is an area, it can be expressed as R $\Delta\Theta$, wherein R is the radius of the hemispherical mirror and $\Delta\Theta$ is the solid angle. Advantageously, the present techniques provide such large area coverage and resolution. Furthermore, the monitoring system should also be adaptable to situations where solar panels are mounted on solar trackers that continuously rotate following the sun and are not static, allowing a continuous tracking of panels even in situations where the orientation of the panels changes. The solar tracker would rotate to follow the sun's position in the sky and the view angle for the solar installation is changing continuously throughout the day. For a general description of a solar tracking system see, for example, U.S. Patent Application Publication Number 2011/0041834, filed by Liao, entitled "Two-Axes Solar Tracker System and Apparatus for Solar Panel and Likes," the contents of which are incorporated by reference herein. Advantageously, the present imaging systems allow for a 360° observation which is well suited to monitoring solar installations having solar trackers.

Among other possible uses, the present imaging systems can also be used to track clouds and extract information about cloud temperature, color, etc. These exemplary implementations are all described in detail below.

First however, a description of the present imaging systems is now provided. The imaging systems described herein utilize a curved optics imaging device that allows 360° degree area coverage which is suitable for large area monitoring like solar farms or observation of extended geographical regions.

In one exemplary embodiment, the curved optics imaging device includes an infrared/visible camera equipped with a fisheye lens (the curved optics) for large-area monitoring wherein the fisheye lens is mounted to the camera. An infrared camera would be used for temperature measurements while a visible camera will be used to identify and delineate the contour of the features like clouds, solar panels, canopy, forest etc. Once the objects are identified, the infrared image will be used to associate temperature with the respective objects. For a general description of fisheye lenses see, for example, U.S. Patent Application Publication Number 2012/0013996, filed by Okumura, entitled "Optical System Having Fisheye Zoom Lens and Optical Apparatus Having the Optical System," the contents of which are incorporated by reference herein. In another exemplary embodiment, the curved optics imaging device includes a hemispherical mirror (the curved optics) that projects a large area image into an infrared/visible camera. Both of these exemplary curved optics imaging device embodiments are described in detail below.

The present imaging systems can be used to pinpoint and localize heat sources that have temperatures that are different (i.e., higher or lower) than their surroundings. In one exemplary implementation, the present imaging system is used to identify defective solar panels that are part of a large solar farm where the defective units will warm up more than their working counterparts. Namely, the increased temperatures of defective solar panels will result in a higher temperature that is detected by the curved optics imaging device in the system. Through geometrical reconstruction the location of the defective solar panel can be identified. In another exemplary implementation, the present imaging systems are used to localize other heat sources like fires and to monitor their spread or extinction. Advantageously, the present imaging systems can be used during the night and day and may be remotely monitored (see below) for continuous data acquisition and processing. Thus, the present thermal imaging system is versatile and can be applied to a variety of different situations which require thermal monitoring.

FIG. 1 is a diagram illustrating one exemplary infrared imaging system 100 according to the present techniques. As provided above, the present imaging systems utilize a curved optics imaging device that allows 360° degree area coverage. In the example shown in FIG. 1, the curved optics imaging device is a (infrared/visible) camera equipped with a fisheye lens. For ease of depiction, the objects and/or dimensions shown in FIG. 1 (or any of the other figures presented herein) may not be drawn to scale. For instance, the field of view or FOV (described below) is shown in FIG. 1 to be much smaller when compared to the size of the camera/fisheye lens than in actual implementations. Namely, as will be described below, the field of view may exceed 1 mile.

As shown in FIG. 1, the curved optics imaging device includes a camera 102 equipped with a fisheye lens 104. The camera 102 is preferably an infrared camera that is sensitive in the near to mid infrared range where temperature changes of from about 0.1° C. to about 2° C. and ranges therebetween can easily be detected. Namely, for small temperature changes measured for room temperature objects, the most effective way is to use a mid infrared photodiode detector that is sensitive in the 2 μm to 5 μm spectral range. That way, for example, the camera can detect a change of 0.1° C. temperature range above normal environmental conditions for solar panels operated under the same conditions. Specifically, with regard to wavelength of detection and temperature resolution—any object will emit in the infrared at a wavelength determined by its temperature. The peak emission wavelength and amplitude shift with temperature. As the temperature changes, the peak intensity changes and that change is picked up by the infrared camera that is calibrated and will relate change in peak to temperature.

The term "infrared camera" as used herein refers to any type of thermo graphic camera. Thermo graphic cameras employ photo detectors to form an image using infrared radiation. The photo detectors are formed from narrow gap semiconductors such as indium antimonide (InSb), cadmium telluride, etc. Some of the photo detectors employed in thermo graphic cameras have to be cooled (i.e., to below room temperature), for example, using liquid nitrogen or thermoelectric materials.

In another exemplary embodiment, the camera 102 is a visible camera, i.e., that can capture images in the visible spectrum. The visible spectrum is the section of the electromagnetic spectrum that is visible/detectable by the human eye. An infrared or visible camera would operate in the same manner in system 100.

In general, infrared light ranges in wavelength of from about 0.74 micrometers (μm) to about 10 μm. However, the infrared band is often subdivided into sections, such as near-infrared (e.g., wavelengths of from about 0.74 μm to about 2 μm), short infrared (wavelengths of from about 2 μm to about 3 μm) and mid infrared (e.g., wavelengths of from about 3 μm to about 8 μm). As highlighted above, the visible spectrum is that portion of the electromagnetic spectrum visible by the human eye (e.g., wavelengths of from about 390 nm to about 700 nm). According to the present techniques, when an infrared camera is used the (infrared) camera is able to detect infrared light in any of these near, short and mid infrared ranges. Similarly, when a visible camera is used, the (visible) camera is able to detect light in the visible spectrum.

The camera 102 may be equipped with an anti-blooming feature that will eliminate the overflow of saturated pixels from regions in the camera that are projecting objects that generate a large signal. By way of example only, such a signal may be the sun that is imaged by the camera 102 which without anti-blooming capabilities might appear much larger due to pixel saturation and overflow of light saturation across pixels. See, for example, U.S. Patent Application Publication Number 2013/0033616, filed by Kaizu et al., entitled "Imaging Device, Imaging Processing Method and Program" (hereinafter "U.S. Patent Application Publication Number 2013/0033616"), the contents of which are incorporated by reference herein (which describes a blooming correction processing unit for receiving an output pixel signal from an image sensor and performing blooming correction for the pixel signal).

According to an exemplary embodiment, the fisheye lens 104 is configured to give the infrared imaging system 100 a potential field of view (FOV) extending over a distance of from about 0.01 miles to about 1.5 miles and ranges therebetween, e.g., about 1 mile. This permits monitoring of a large area, such as a solar farm and/or the cloud cover over a large area. When positioned facing the ground, the field of view depends on the distance at which the camera is positioned from the ground. When facing skyward (such as to image cloud cover) the FOV will be the same, but objects that are farther away from the camera will appear smaller in the image. Using two cameras, with well known separation, the height of the object can be extracted from the images.

As shown in FIG. 1, the curved optics imaging device of system 100 is mounted on a stand (or other similar supporting structure). In the example shown in FIG. 1, the stand suspends the curved optics imaging device above the ground, facing the ground. However, this is only an example. For instance, when monitoring a solar installation, it may be desirable to mount the curved optics imaging device as shown in FIG. 1 since the solar panels are located at ground level. The stand is however preferably configured to support the curved optics imaging device in any orientation such that the imaging device can point in any direction. For instance, when imaging cloud cover, the curved optics imaging device may be mounted pointing towards the sky.

Figure 1A:
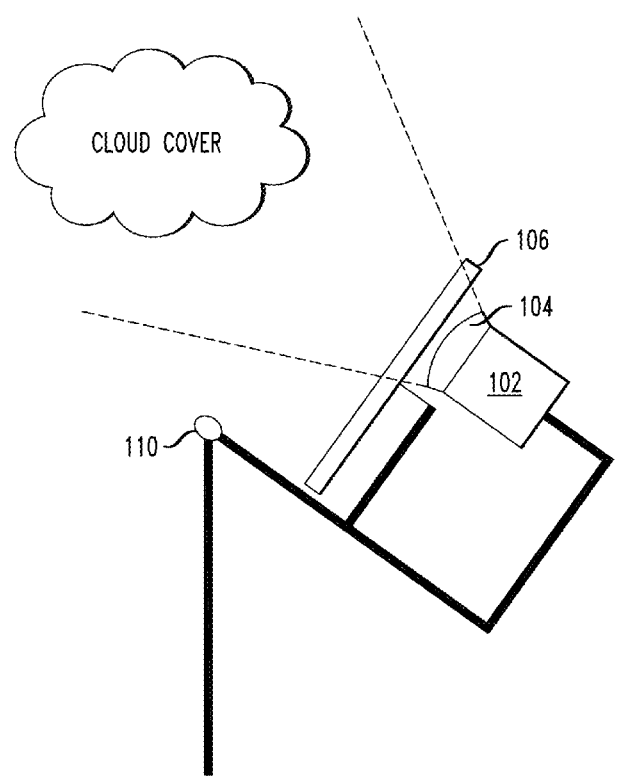
FIG. 1A is a diagram illustrating repositioning of the curved optics imaging device according to an embodiment of the present invention.

By way of example only, as shown in FIG. 1, the stand includes a pivot point 110 which permits the curved optics imaging device to be positioned in any direction, and at any angle. An example of the curved optics imaging device being positioned (by way of the pivot point 110) in another direction is shown in FIG. 1A (in this case the stand is repositioned to orient the imaging system to point skyward). In the example shown in FIG. 1A, the imaging system is being employed to measure the temperature of the clouds.

The camera can be positioned downward to reduce the sun glare or can be oriented in any other position—in which case a sun blocking device may be integrated into the imaging system to eliminate the light saturation caused by the sun. The sun blocking device can be a shadow band or it can be a sun tracking device that will have a blocking feature that would track the sun and reduce the saturation of the light coming from the sun. For a description of a sun blocking device see, for example, C. N. Long et al., "Retrieving Cloud Characteristics from Ground-Based Daytime Color All-Sky Images," Journal of Atmospheric and Oceanic Technology, Volume 23, May 2006 (hereinafter "Long"), the entire contents of which are incorporated by reference herein. In Long the sun blocking device consists of a dull black strip on the imaging mirror and the mirror rotates to keep the strip aligned with the solar azimuth angle to block the direct sun from the camera. A similar sun blocking strip is visible in the exemplary image provided in FIG. 7A, described below. In that example, the sun blocking strip used was a metal band that functions in the same way as described in Long to block direct sun from the camera.

Spectral filtering may be employed in conjunction with the present imaging systems in order to select (or eliminate) information from the image captured based, for example, on wavelength. Specifically, one or more light filters (108a, 108b, etc.) may be positioned in front of the camera 102, each of the filters being tailored to a specific wavelength and thus let only a certain wavelength of light pass therethrough. The light filters (108a, 108b, etc.) used can range from visible range of light spectrum up to infrared for thermal monitoring. The filters can also be configured to change the amplitude of the light that is transmitted through the filters to modulate light intensity. Commercially available light filters may be employed, such as the narrow band light filters available from International Light Technologies, Peabody, Mass. The filters will be used to discriminate the features from background. Any object that is hot will have a blackbody radiation emission spectrum peaking at a given wavelength. The surrounding object will emit at a different wavelength. If both have high temperature, it would be difficult to discriminate the two effects. Two filters with narrow transmission bands on those two wavelengths can be used to subtract the images to identify the two features. Each filter will allow light to pass at a specific wavelength and will thus allow one to filter out all the other wavelengths. This way large background signals can be eliminated. The particular filters that may be employed for a given application may depend on the objects being imaged (e.g., solar panels, clouds etc.) and some experimentation within the capabilities of one skilled in the art may be needed to determined the correct range of filters to employ in order to attain maximum contrast between the objects being monitored and the background.

The amplitude and wavelength, if so desired, can be changed using the same filters or wavelength and amplitude can be changed independently each with a different set of filters in the manner described above. For instance, one could acquire a series of images at different amplitude, and keep subtracting them to eliminate the saturation that may be caused by the sun or very high temperature. For a description of amplitude filters see, for example, S. Mezouari et al., "Amplitude and phase filters for migration of defocus and third-order aberrations," Proceedings of the SPIE, Volume 5249, pp. 238-248 (February 2004), the entire contents of which are incorporated by reference herein.

With spectral filtering, the same image can be acquired at different wavelengths. The filters (108a, 108b, etc.) will allow light from a very narrow band to pass through the filters and be captured by the imaging system. As described above, images acquired at different wavelength and amplitude can be used to eliminate the background in images where small changes are to be detected and these changes are on top of large signals. By way of example only, the filter employed can have a band from 10 nm up to 2 micrometers (µm) and will be specific to the application. It will be based on the black body emission peak wavelength, and one would preferably want to have filters with a band path on all of those peaks, for example on 1 µm, 1.4 µm, and 2 µm with a band path of 0.2 µm, chosen such that the transmission windows do not overlap. The band pass is usually adjusted by depositing metal thin films on a glass and using different film thickness and also optical reflective index, and thus the band pass can be easily adjusted. The amplitude attenuation and band pass width will be adjusted according to the applications.

Images acquired at different wavelength and amplitude can be used to eliminate the background in images where small changes are to be detected and these changes are on top of large signals. In such situations it is more advantageous to subtract the large signal from the image—which can be achieved through various wavelength and amplitude signal imaging and subtraction, e.g., using the light filters 108. While the camera used in the present infrared imaging system can be configured to detect infrared light in these long and/or far infrared ranges as well, detection in the near to mid infrared ranges is suitable for the applications described herein.

While the filter (108a, 108b, etc.) in front of the camera 102 can be changed manually, it is preferable that this process is performed automatically. For example, as will be described in detail below, imaging system 100 is preferably operated by a remote monitoring system (such as apparatus 1000, of FIG. 10, described below) that receives and processes data from the imaging system 100. This remote monitoring system can also be configured to control the positioning of filters 108 in front of camera 102. By way of example only, the filters (108a, 108b, etc.) can be mounted on a circular carrier 106, in a carousel fashion, such that when carrier 106 is rotated (clockwise and/or counterclockwise) a different filter (108a, 108b, etc.) is positioned in front of the camera 102. The carrier 106 can be mounted on the stand and its movements (rotation) controlled by a servo or other type of remotely controllable motor (not shown) under the control of the remote monitoring system. The particular (wavelength, amplitude, etc.), number, etc. of filters (108a, 108b, etc.) employed are application-specific (see above), and different carriers 106/filters can be interchanged when needed. According to an exemplary embodiment, images are captured using each filter 108 on the carrier 106 in succession (by capturing an image using one of the filters 108a, rotating the carrier 106 to position the next filter 108b in front of the camera 102, capturing an image using filter 108b, and so on).

As will be described in detail below, the curved optics imaging device captures a circular shapes image (also referred to herein as a spherical image—i.e., an image having spherical coordinates) which can be processed so as to eliminate distortion created by the spherical surface and to establish a correlation between positions of the objects in the field and location in the image obtained by the camera 102. According to an exemplary embodiment, the acquired image is unfolded from the spherical coordinate system to a flat Cartesian image to eliminate distortion. In the spherical coordinate system the objects in the middle of the image would appear larger than they are while at the edge of the image will be reduced from their original size. An exemplary technique for unfolding a circular shapes image is described in conjunction with the description of FIGS. 6 and 7, below.

Figure 2:
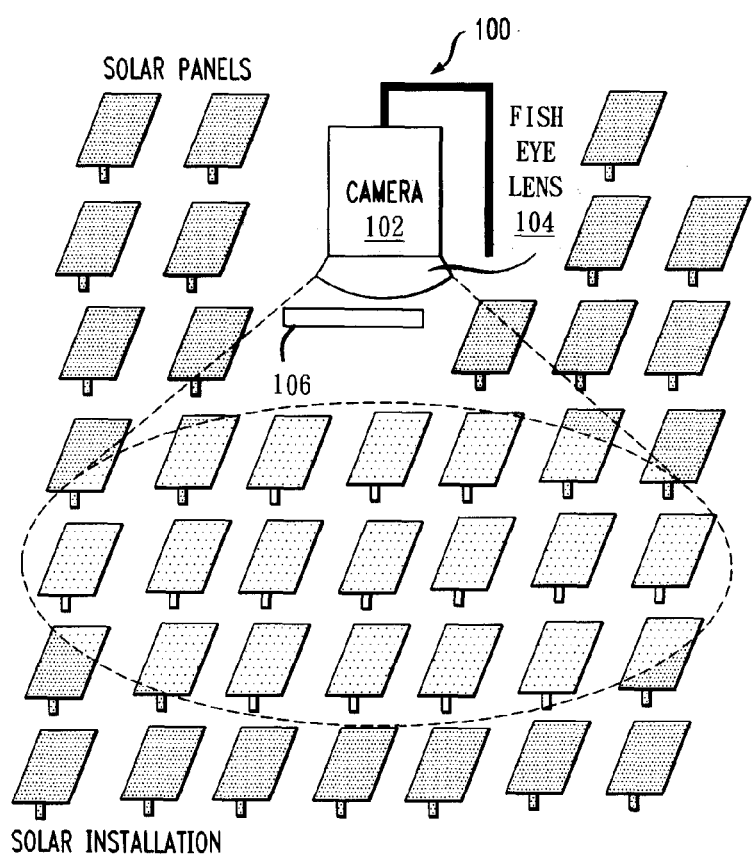
FIG. 2 is a schematic diagram illustrating an exemplary implementation of the imaging system of FIG. 1 for thermal detection in a solar farm according to an embodiment of the present invention.

To further illustrate the present techniques, an exemplary implementation of the infrared imaging system 100 of FIG. 1 is shown in FIG. 2. In FIG. 2, the present imaging system is being employed for thermal detection in a solar farm (labeled "solar installation"). Solar farms are large scale photovoltaic systems employing a multitude of solar panels. As described above, the solar panels are commonly mounted in a series-parallel configuration where a number of panels are mounted as a string in series to increase the voltage and then the string of solar panels are mounted in parallel to increase the current. A defective panel(s) exhibit(s) a higher temperature than the surrounding panels. This temperature differential can be detected by the present imaging system.

The spatial resolution of the imaging system 100 is determined by a few factors—for example—the numbers of pixels for the infrared camera and the height of the camera above the ground. For a high resolution infrared camera (for example 640×480) a smaller region from the ground can be detected as an individual feature (angular resolution of the imaging system that would provide the smallest angle detected by the imaging system). With a calibrated imaging system any object on the ground can be identified both as orientation, size and distance from the camera system.)

Namely, as shown in FIG. 2, imaging system 100 is centrally positioned in the cluster of solar panels in order to insure that all of the panels are within the field of view of the system. See above. To cover even larger areas, as will be described below, multiple installations of the present imaging system may be used (for example in a grid format) to increase overall field of view.

The use of the present imaging system for thermal detection in a solar farm (as shown in FIG. 2) is merely exemplary. Namely, as will be described in detail below, the infrared imaging system and techniques for use thereof presented herein are broadly applicable to any application involving thermal detection over a large area, e.g., over distances of from about 0.01 miles to about 1.5 miles and ranges therebetween. An example of another suitable application of the present infrared monitoring system would be in the detection of wild fires. Namely, fires involve localized heat sources which can effectively be detected using the present imaging system. As will be described below, it is possible to use multiple installations of the present system, as an imaging network, so as to cover a larger detection area (see, for example, FIG. 5, described below).

Figure 3:
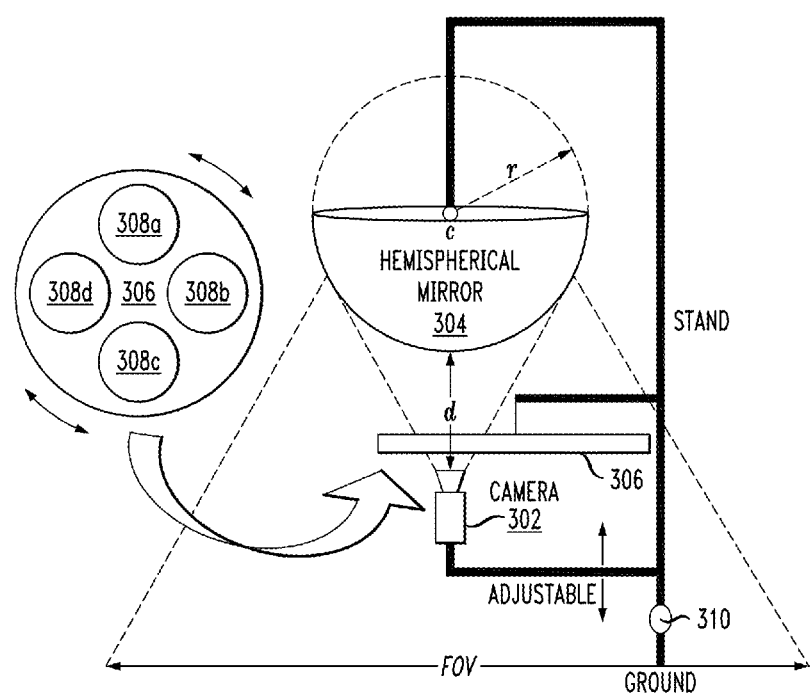
FIG. 3 is a diagram illustrating another exemplary imaging system having a curved optics imaging device that includes a (e.g., thermal) camera positioned to obtain images from a hemispherical mirror according to an embodiment of the present invention.

In another exemplary embodiment, instead of a camera and fisheye lens, the curved optics imaging device includes an infrared/visible camera 302 and a hemispherical mirror 304 for large area monitoring. See FIG. 3. FIG. 3 is a diagram illustrating an exemplary infrared imaging system 300 according to the present techniques. As above, for ease of depiction, the objects and/or dimensions shown in FIG. 3 (or any of the other figures presented herein) may not be drawn to scale. For instance, the field of view or FOV (described below) is shown in FIG. 3 to be much smaller when compared to the size of the hemispherical mirror and camera than in actual implementations. Namely, as will be described below, the field of view (FOV) may exceed 1 mile.

As shown in FIG. 3, the present infrared imaging system includes a curved optics imaging device that consists of a camera 302 and a hemispherical mirror 304. According to an exemplary embodiment, the hemispherical mirror is a convex metal coated mirror having a radius r of from about 0.1 foot to about 2 feet and ranges therebetween, e.g., from about 0.1 foot to about 1.5 feet and ranges therebetween. The radius of the hemispherical mirror will determine the resolution of the object that is detected by the imaging system 300. The spatial resolution of the imaging system 300 is determined by a few factors—for example—the numbers of pixels for the infrared camera 302, the radius of the hemispherical mirror and the height above the ground of the camera system (for example, the height of the mirror above the ground wherein the mirror is short distance from the camera) (see below). For a high resolution infrared camera (for example 640×480) and a large radius mirror a smaller region from the ground can be detected as an individual feature (angular resolution of the imaging system that would provide the smallest angle detected by the imaging system). With a calibrated imaging system, any object on the ground can be identified both as orientation, size and distance from the camera system.

In theory, any metal coating on the mirror will reflect infrared radiation, and metals such as aluminum and silver may be employed. However, since the present imaging systems will be continually subjected to the elements, it is preferable that the metal(s) employed do not oxidize or rust in outdoor environments. One possible option would be stainless steel. The infrared imaging system allows a large area monitoring based on the hemispherical mirror having a field of view (FOV) extending over a distance of from about 0.01 miles to about 1.5 miles and ranges there between, e.g., about 1 mile.

As shown in FIG. 3, the (metal-coated) mirror 304 is positioned facing the ground which creates an image of objects situated at levels below the mirror 304. The camera 302 is pointing upward (facing the convex reflective surface of the mirror) and captures the images of the object reflected in the mirror 304. In this example, the mirror 304 is a convex hemispherical mirror, i.e., having a convex reflective surface.

In one exemplary embodiment, the camera 302 is an infrared camera that is sensitive in the near to mid infrared range where temperature changes of from about 0.1° C. to about 2° C. and ranges therebetween can easily be detected. Namely, for small temperature changes measured for room temperature objects, the most effective way is to use a mid infrared photodiode detector that is sensitive in the 2 micrometer (μm) to 5 μm spectral range. The term "infrared camera" as used herein refers to any type of thermo graphic camera. Thermo graphic cameras employ photo detectors to form an image using infrared radiation. The photo detectors are formed from narrow gap semiconductors such as indium antimonide (InSb), cadmium telluride, etc. Some of the photo detectors employed in thermo graphic cameras have to be cooled (i.e., to below room temperature), for example, using liquid nitrogen or thermoelectric materials.

In another exemplary embodiment, the camera 302 is a visible camera, i.e., that can capture images in the visible spectrum. The visible spectrum is the section of the electromagnetic spectrum that is visible/detectable by the human eye. An infrared or visible camera would operate in the same manner in system 300. A visible camera will be used for identification of object and discrimination of object boundary from the background. The visible camera system can have a very high resolution 1920×1920 or even higher. The infrared will be used for thermal detection of the temperature of the objects.

In general, infrared light ranges in wavelength of from about 0.74 micrometers (μm) to about 10 μm. However, the infrared band is often subdivided into sections, such as near-infrared (e.g., wavelengths of from about 0.74 μm to about 2 μm), short infrared (wavelengths of from about 2 μm to about 3 μm) and mid infrared (e.g., wavelengths of from about 3 μm to about 8 μm). As highlighted above, the visible spectrum is that portion of the electromagnetic spectrum visible by the human eye (e.g., wavelengths of from about 390 nm to about 700 nm). According to the present techniques, when an infrared camera is used the (infrared) camera is able to detect infrared light in any of these near, short and mid infrared ranges. Similarly, when a visible camera is used the (visible) camera is able to detect light in the visible spectrum.

The camera 302 may be equipped with an anti-blooming feature that will eliminate the overflow of saturated pixels from regions in the camera that are projecting objects that generate a large signal. Anti-blooming technology was described above. See also U.S. Patent Application Publication Number 2013/0033616.

As shown in FIG. 3, a stand (or other similar supporting structure) is used to suspend the hemispherical mirror above the ground, facing the ground. In the exemplary embodiment shown, the stand also serves to support the camera (which faces the hemispherical mirror) and to position the camera at a distance d from the hemispherical mirror. The distance d may vary depending on the particular application at hand. For example, the distance d varies depending on the dimensions of the hemispherical mirror and the focal length of the imaging optics.

It is desirable that the camera is located above the apex of the hemispherical mirror. The apex or vertex of a hemispherical mirror is the top of the spherical mirror. Namely, the normal to the center of a hemispherical mirror is also known as the principal axis. The point at which the principal axis touches the surface of the mirror is the apex or vertex of the mirror. It is desirable to place the camera along the principal axis facing the apex of the mirror such that image flattening can be done around that point and would offer the maximum coverage for the image. Thus, the camera is preferably positioned to face the center of the reflective surface of the mirror. As highlighted above, the distance d is dependent on the dimensions of the mirror and the focusing optics of the camera system. The mirror should be in the focal plane of the imaging system. For example, the given hemispherical mirror employed will have a given radius of curvature. The radius of curvature is the distance along the principal axis (see above) from the apex/vertex to the center of curvature. The center of curvature c is the point on the principal axis which is equidistant from all reflecting surfaces of the mirror. The point, again on the principal axis, that is halfway between the vertex and the center of curvature marks the focal point of the mirror. It is preferable to adjust the distance d to place the camera at the focal point of the mirror (facing the center of the reflective surface of the mirror—see above). This enables the camera to form an image of far field objects on the hemispherical mirror. According to an exemplary embodiment, the distance d may be adjusted by configuring a height of an arm of the stand supporting the camera to be adjustable (see FIG. 3). The goal in the relationship of the hemispherical mirror and the camera is to produce an image, reflected off of the hemispherical mirror, onto the image plane on the surface of the camera. As provided above, the hemispherical mirror is preferably a metal coated mirror, as the metal coating on the mirror will reflect infrared radiation from the objects being imaged onto the camera. As will be described in detail below, the image of the mirror results in a circular shapes image which can be processed so as to eliminate distortion created by the spherical surface and to establish a correlation between positions of the objects in the field and location in the image obtained by the camera.

As shown in FIG. 3, the stand can include a pivot point 310 which would permit the curved optics imaging device to be positioned in any direction, and at any angle. An example of the present imaging system being repositioned by way of the pivot point is shown illustrated in FIG. 1A, described above. The same concepts would apply here with imaging system 300. Thus, by way of example only, the imaging system 300 could be positioned (via pivot point 310) to point skyward, thus enabling thermal imaging of cloud cover.

The camera can be positioned downward to reduce the sun glare or can be oriented in any other position—in which case a sun blocking device may be integrated into the imaging system to eliminate the light saturation caused by the sun. The sun blocking device can be a shadow band or it can be a sun tracking device that will have a blocking feature that would track the sun and reduce the saturation of the light coming from the sun.

As described above, spectral filtering may be employed in conjunction with the present imaging systems in order to select (or eliminate) information from the image captured based, for example, on wavelength. In the exemplary embodiment shown in FIG. 3, a carousel of filters is employed in the same manner as described in conjunction with the description of FIG. 1, above. Namely, as shown in FIG. 3, one or more light filters (308a, 308b, etc.) may be positioned in front of the camera 302, each of the filters is tailored to a specific wavelength and thus lets only a certain wavelength of light pass therethrough. The light filters (308a, 308b, etc.) can range from visible range of light spectrum up to infrared for thermal monitoring (see above). The filters can also be configured to change the amplitude of the light that is transmitted through the filters to modulate light intensity.

As described above, spectral filtering permits the same image to be captured at different wavelengths. The filters (308a, 308b, etc.) will allow light from a very narrow band (e.g., see above regarding use of commercially available narrow band light filters) to pass through the filters and be captured by the imaging system.

Images acquired at different wavelength and amplitude can be used to eliminate the background in images where small changes are to be detected and these changes are on top of large signals. In such situations, it is more advantageous to subtract the large signal from the image—which can be achieved through various wavelength and amplitude signal imaging and subtraction, e.g., using the light filters 308. While the camera used in the present infrared imaging system can be configured to detect infrared light in these long and/or far infrared ranges as well, detection in the near to mid infrared ranges is suitable for the applications described herein.

While the light filter (308a, 308b, etc.) in front of the camera 302 can be changed manually, it is preferable that this process is performed automatically. For example, imaging system 300 is preferably operated by a remote monitoring system (such as apparatus 1000, of FIG. 10, described below) that receives and processes data from the imaging system 300. This remote monitoring system can also be configured to control the positioning of filters 308 in front of the camera 302. In the same manner as described, for example, in conjunction with the description of system 100 of FIG. 1, above, the filters (308a, 308b, etc.) can be mounted on a circular carrier 306, in a carousel fashion, such that when carrier 306 is rotated (clockwise and/or counter-clockwise) a different filter (308a, 308b, etc.) is positioned in front of the camera 302. The carrier 306 is preferably mounted on the stand and its movements (rotation) are controlled by a servo or other type of remotely controllable motor (not shown) under the control of the remote monitoring system. The particular (wavelength, amplitude, etc.), number, etc. of filters (308a, 308b, etc.) employed are application-specific, and different carriers 306/filters can be interchanged when needed. According to an exemplary embodiment, images are captured using each filter 308 on the carrier 306 in succession (by capturing an image using one of the filters 308a, rotating the carrier 306 to position the next filter 308b in front of the camera 302, capturing an image using filter 308b, and so on).

As will be described in detail below, the curved optics imaging device captures a circular shapes image which can be processed so as to eliminate distortion created by the spherical surface and to establish a correlation between positions of the objects in the field and location in the image obtained by the camera 302. According to an exemplary embodiment, the acquired image is unfolded from the spherical coordinate system to a flat Cartesian image to eliminate distortions. In the spherical coordinate system the objects in the middle of the image would appear larger than they are while at the edge of the image they will be reduced from their original size. An exemplary technique for unfolding a circular shapes image is described in conjunction with the description of FIGS. 6 and 7, below. As shown in FIG. 3, the camera is positioned (e.g., by way of the stand) above ground level. As will be described in detail below, the present imaging system may be employed to monitor large areas (e.g., distances of from about 0.01 miles to about 1.5 miles and ranges therebetween), and thus it may be desirable to position the camera off of the ground so as to enable capturing a larger viewing area (i.e., maintaining a given distance d given that the hemispherical mirror has to be a certain distance above the ground to attain a requisite field of view would in many applications require that the camera be positioned off of the ground). This is however not a requirement.

Further, as shown in FIG. 3, it is preferable that the camera point directly at the hemispherical mirror, rather than at an angle. Specifically, the camera should be aligned along a principal axis of the hemispherical mirror—facing the center of the mirror, see above. The principal axis of a hemispherical mirror is a line that passes from a surface of the mirror through the center c of the mirror (see FIG. 3).

Figure 4:
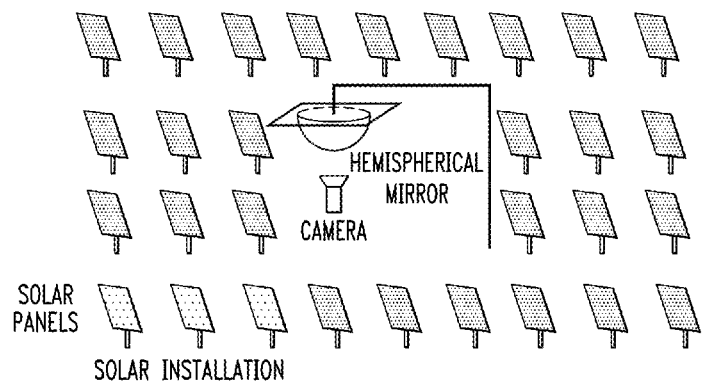
FIG. 4 is a schematic diagram illustrating an exemplary implementation of the imaging system of FIG. 3 for thermal detection in a solar farm according to an embodiment of the present invention.

To further illustrate the present techniques, an exemplary implementation of the infrared imaging system of FIG. 3 is shown in FIG. 4. In FIG. 4, the present imaging system is being employed for thermal detection in a solar farm (labeled "solar installation") employing a multitude of solar panels. As described above, the solar panels are commonly mounted in a series-parallel configuration where a number of panels are mounted as a string in series to increase the voltage and then the string of solar panels are mounted in parallel to increase the current. A defective panel(s) exhibit(s) a higher temperature than the surrounding panels. This temperature differential can be detected by imaging system 300.

Namely, as shown in FIG. 4, imaging system 300 is centrally positioned in the cluster of solar panels in order to insure that all of the panels are within the field of view (FOV) of the system. See above. To cover even larger areas, as will be described below, multiple installations of the present imaging system may be used (for example in a grid format) to increase overall field of view.

The use of the present imaging system for thermal detection in a solar farm (as shown in FIG. 4) is merely exemplary. Namely, as will be described in detail below, the infrared imaging system and techniques for use thereof presented herein are broadly applicable to any application involving thermal detection over a large area, e.g., over distances of from about 0.01 miles to about 1.5 miles and ranges therebetween. An example of another suitable application of the present infrared monitoring system would be in the detection of wild fires. Namely, fires involve localized heat sources which can effectively be detected using the present imaging system. As will be described below, it is possible to use multiple installations of the present system, as an imaging network, so as to cover a larger detection area (see, for example, FIG. 9, described below).

Figure 5A:
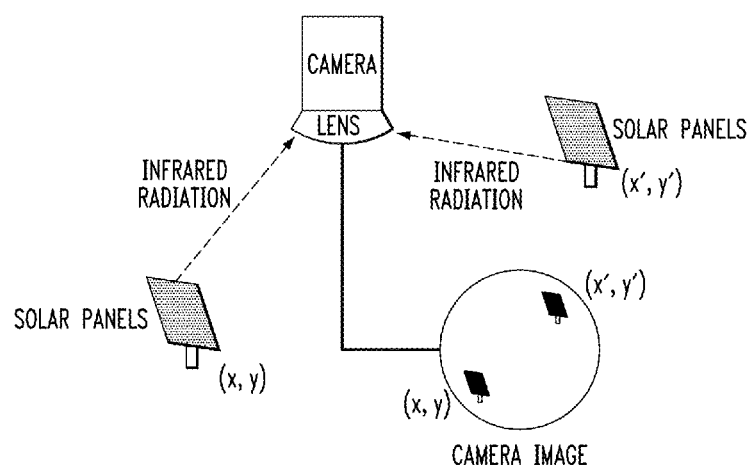
FIG. 5A is a schematic diagram illustrating operation of the imaging system of FIG. 1 according to an embodiment of the present invention.

FIG. 5A is a schematic diagram illustrating operation of the present imaging systems. In the example shown in FIG. 5A, imaging system 100 of FIG. 1 is shown which, as described above, has a camera equipped with a fisheye lens. An example showing use of an imaging system having a camera and a hemispherical mirror (such as imaging system 300 of FIG. 3) is shown illustrated in FIG. 5B. It is notable that in either imaging system spectral filtering may be employed as described in detail above. However, for ease and clarity of depiction, the filter components are not shown in FIGS. 5A and 5B.

For illustrative purposes the exemplary implementation shown is that of monitoring a solar installation (or solar farm), although the system would operate in the same manner regardless of what objects (forest fires, clouds, etc.) are being imaged. As shown in FIG. 5A, the camera equipped with a fisheye lens is positioned facing down towards the ground. In this example, the camera is an infrared camera. As shown in FIG. 5A, infrared radiation from the solar panels (which are within the field of view FOV of the camera) is captured by the camera via the fisheye lens. The infrared image captured by the camera in this example is shown in FIG. 5A. As shown, use of the fisheye lens results in a circular shape image. However, as shown in FIG. 5A, each of the objects (in this case solar panels) has a unique set of location coordinates. Thus, for instance, the solar panel shown on the left has the location coordinates (x,y) and the solar panel shown on the right has the location coordinates (x',y'). These location coordinates can be used to uniquely identify the objects within the image. Deconvolution of the image can be performed from the spherical axis to a Cartesian system where objects (in this case solar panels) can be identified on a two dimensional map (see FIGS. 6 and 7, described below).

While the operation of an imaging system having a hemispherical mirror and camera positioned to capture images reflected off of the mirror (such as imaging system 300 of FIG. 3) is the same as that of the camera/fisheye lens embodiment, for completeness of description operation of the hemispherical mirror/camera configuration is shown illustrated in FIG. 5B.

FIG. 5A is a schematic diagram illustrating operation of the present imaging systems. In the example shown in FIG. 5A, imaging system 100 of FIG. 1 is shown which, as described above, has a camera equipped with a fisheye lens. An example showing use of an imaging system having a camera and a hemispherical mirror (such as imaging system 300 of FIG. 3) is shown illustrated in FIG. 5B.

Again, while the exemplary implementation shown in FIG. 5B is that of monitoring a solar installation (or solar farm), the system would operate in the same manner regardless of what objects (forest fires, clouds, etc.) are being imaged. As shown in FIG. 5B, the hemispherical mirror is positioned facing down towards the ground (i.e., the reflective surface of the hemispherical mirror is facing downward). The camera, in this example an infrared camera, is positioned to capture infrared radiation reflected by the hemispherical mirror. As described above, it is preferable to have the camera located above the apex of the hemispherical mirror. As shown in FIG. 5B, infrared radiation from the solar panels (which are within the field of view FOV of the hemispherical mirror) is reflected off of the hemispherical mirror. That infrared radiation is captured by the camera. The infrared image captured by the camera in this example is shown in FIG. 5B. As shown, the image of the mirror results in a circular shape image. However, as shown in FIG. 5B, each of the objects (in this case solar panels) has a unique set of location coordinates. Thus, for instance, the solar panel shown on the left has the location coordinates (x,y) and the solar panel shown on the right has the location coordinates (x',y'). These location coordinates can be used to uniquely identify the objects within the image.

Deconvolution of the image can be performed from the spherical axis to a Cartesian system where objects (in this case solar panels) can be identified on a two dimensional map. This procedure is now described by way of reference to FIGS. 6 and 7.

Specifically, objects in a spherical system will appear larger than they are in the middle of the lens or hemispherical mirror and become smaller toward the edge of the lens/mirror where they will be reduced from their original size. The distortion will always be larger at the edge of the image. Deconvolution can be used to compress the middle part of the image and stretch out the edges. For the image, the concentric circles show the way a hemispherical/fisheye lens image may be acquired by the curved optics. See FIG. 6A. As shown in FIG. 6A, the concentric circles are unevenly distributed in the spherical image. The deconvolution will distribute the concentric circles uniformly/evenly in the Cartesian coordinate across the whole image.

For example, the as-obtained images can be unfolded to eliminate distortion created by the spherical surface and to establish a correlation between position of the objects in the field and location in the image obtained by camera. Unfolding the image here involves converting the image from how it appears on the hemispherical reflective surface of the mirror/fisheye lens to a flat surface for analysis and viewing. Image unfolding can be accomplished using commercially available computer aided design (CAD) tools, such as Auto-CAD® and TouchCAD or any image processing software.

According to an exemplary embodiment, the unfolding process uses anchor points (structures with well known height and distance from the camera system) situated around the imaging system. Anchor points can be any fixed objects, like the position and height of an inverter box in a solar installation or a nearby imaging system. Knowing the distance to the object, the image can be calibrated to translate objects in the image to real distances. Use of the anchor points being used to unfold the image is shown in FIG. 6B. The result is an even distribution of concentric circles in the Cartesian coordinate across the whole image. See FIG. 6C.

Figure 7A:
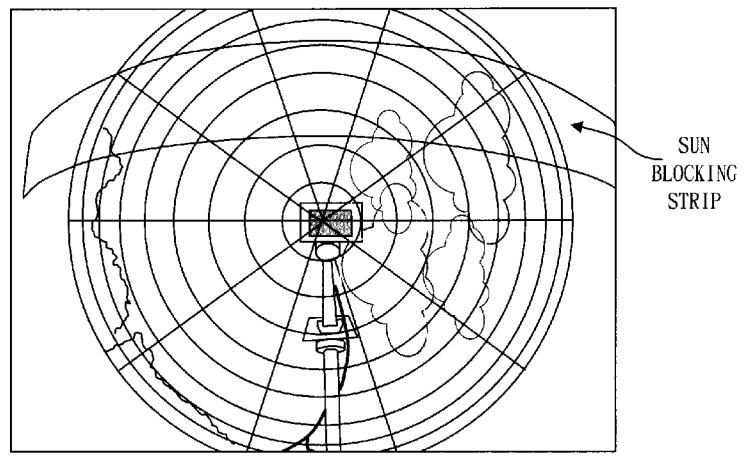
FIG. 7A is a diagram illustrating a spherical image of a cloud wherein distortion in the image is shown by way of the unevenly distributed concentric circles overlaying the image according to an embodiment of the present invention.
Figure 7B:
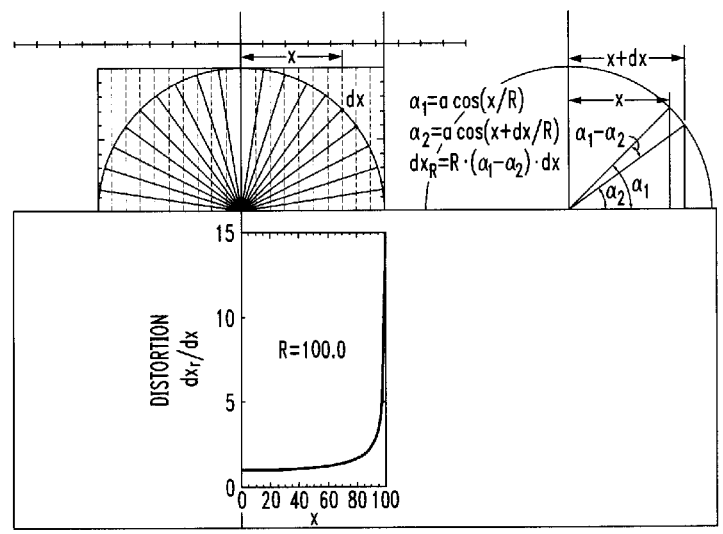
FIG. 7B is a diagram illustrating deconvolution being used to compress the middle part of the image of FIG. 7A and stretch out the edges according to an embodiment of the present invention.
Figure 7C:
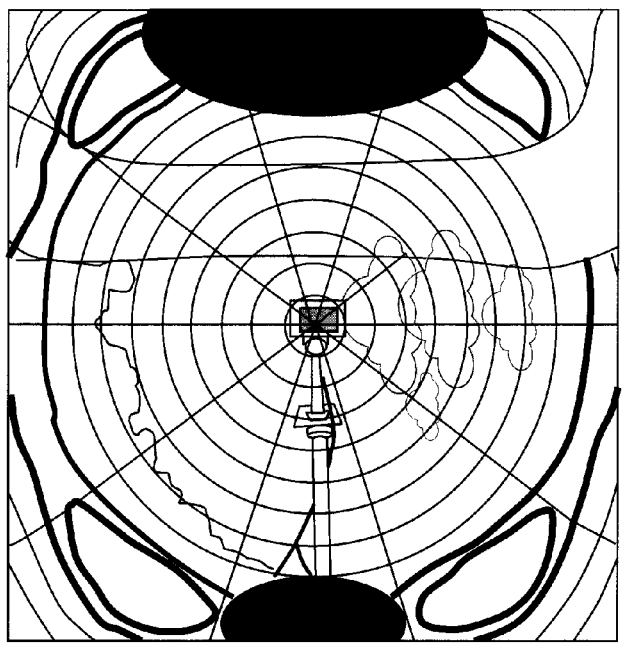
FIG. 7C is a diagram illustrating the result of the deconvolution process where the concentric circles are now even spaced over the image according to an embodiment of the present invention.

To further illustrate the deconvolution process, a non-limiting example of the present deconvolution process being performed on a spherical image of a cloud is provided in FIGS. 7A-C. Specifically, as shown in FIG. 7A, the image captured of a cloud using a camera and hemispherical mirror as described herein will be distorted (due to the spherical mirror/fisheye lens) and as a result objects in the middle of the image appear larger than they are and become smaller toward the edge of the image where they are reduced from their original size. This distortion in the spherical image is illustrated in FIG. 7A by way of the unevenly distributed concentric circles shown overlaying the image.

Following the procedures provided in conjunction with the description of FIGS. 6A-C above, as shown in FIG. 7B, deconvolution is then used to unfold the image (compress the middle part of the image and stretch out the edges). The result of the deconvolution process is shown in FIG. 7C, where the concentric circles are now even spaced over the image.

By way of example only, an unfolding methodology that may be implemented in accordance with the present techniques is as follows:

```
Function mmts_transformImage,im,Ro,xc,yc,R=R,n=n,check=check
pi=3.1415927
if n_elements(R) EQ 0 then R=100.0
if n_elements(n) EQ 0 then n=10
if keyword_set(check) then begin
!X.Style=1 & !Y.Style=1 & !P.Position=[0,0,1,1]
Window,0,XSize=1024,YSize=768,Title='Original    Image'    &
plot,[0,1023],[0,767],/nodata
TVSCL,im,true=3
endif
for i=0,n do begin
R=Ro /n* i & an=180.0/n*i/2.0
R=Ro*sin(an/180.0*pi)& a=findgen(361)/360.0*pi
if keyword_set(check) then begin
oplot,R*cos(a)+xc,R*sin(a)+yc,thick=1
oplot,R*cos(a)+xc,-R*sin(a)+yc,thick=1
endif
endfor
if keyword_set(check) then begin
for i=0,n do begin
an=360.0/n*i
oplot,[xc,xc+Ro*cos(an/180.0*pi)],[yc,yc+Ro*sin(an/180.0*pi)]
endfor
im=fix(TVRD(0,true=3))
endif
im1=intarr(1024,1024,3)
im1(0:1023,100:867,*)=im
im=im1(fix(xc−R):fix(xc+R),fix(yc+100−R):fix(yc+100+R),*)
if keyword_set(check) then begin
Window,0,XSize=2*fix(R)+1,YSize=2*fix(R)+1,Title='Original Image'
plot,[0,847],[0,847],/nodata
TV,im,true=3
endif
; non distorted
np=10.0
x=fltarr((np+1)^2) & y=fltarr((np+1)^2)
an=2*findgen(np+1)/np*pi
Rp=findgen(np+1)/np*R
q=0
for ian=0,np do begin & for iRP=0,np do begin
x(q)=Rp(iRP)*cos(an(ian))+Ro & y(q)=Rp(iRP)*sin(an(ian))+Ro & q=q+1
endfor & endfor
if keyword_set(check) then oplot,x,y,psym=2
u=fltarr((np+1)^2) & v=fltarr((np+1)^2)
an=2*findgen(np+1)/np*pi
on=findgen(np+1)/np*pi/2
Rp=R*sin(on)
q=0
for ian=0,np do begin & for iRP=0,np do begin
u(q)=Rp(iRP)*cos(an(ian))+Ro
v(q)=Rp(iRP)*sin(an(ian))+Ro
q=q+1
endfor & endfor
if keyword_set(check) then oplot,u,v,psym=4
deg=3 & interp = 1
polywarp,u,v,x,y, deg, xm, ym;
im_stretched=im
for i=0,2 do begin
q = POLY_2D(im(*,*,i), xm, ym, interp)
im_stretched(*,*,i)=q
endfor
if keyword_set(check) then begin
Window,2,XSize=2*fix(R)+1,YSize=2*fix(R)+1
TV,im_stretched,true=3
endif
return,im_stretched
End
```

Figure 8:
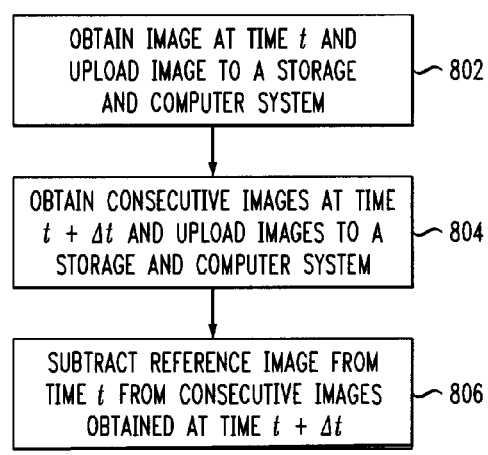
FIG. 8 is a diagram illustrating an exemplary methodology of using the present imaging system for thermal monitoring according to an embodiment of the present invention.

FIG. 8 is a diagram illustrating an exemplary methodology 800 of using the present imaging systems for thermal monitoring. First, in step 802, as described above, the present imaging system (e.g., imaging system 100 of FIG. 1 and/or imaging system 300 of FIG. 3) is used to obtain a thermal image of an area equivalent in size to the field of view of the hemispherical mirror/fisheye lens at a time t. By way of example only, the field of view is from about 0.01 miles to about 1.5 miles and ranges therebetween, e.g., about 1 mile. However, as will be described in detail below, the field of view can be extended by employing multiple installations of the present imaging system, as an imaging network, covering preferably overlapping areas so that the images can be correlated, and then stitching together the images to gain a perspective of an even larger area than can be covered by a single unit. In that case, in step 802 images would be obtained from each of the multiple imaging systems at time t.

The camera image (or images in the case of multiple installations, see above) is/are uploaded to a storage and computer system. An exemplary computer system having storage memory is provided in FIG. 10, described below. According to an exemplary embodiment, the image recorded at time "t" is used as a reference and subtracted from consecutive images recorded at a later time. For example, in step 804, one or more consecutive images are obtained at time(s) "t+Δt." Namely, images can be obtained at time intervals (for multiple Δt's) to assess relative and absolute changes at a time resolution that cannot be achieved with any other techniques. The time interval employed might vary depending on the application at hand, and intervals ranging from seconds to minutes to once daily readings (or even longer) are anticipated herein. By way of example only, readings may be taken every 30 seconds (or every hour, or every 24 hours, etc.) starting from time t. According to an exemplary embodiment, readings are taken at intervals of 1 second or greater, e.g., from about 1 second to about 60 seconds, and ranges therebetween. Thus, the present techniques provide readings with a very high temporal resolution. The Δt employed can be adjustable based on the time constant changes for the objects under study (for example it can be seconds for wildfires, minutes for agricultural land, and hours for solar farm measurements). As described above, this step is performed for each of multiple installations of the present imaging system if so employed.

In step 806, the reference image from time t (step 802) is subtracted from the consecutive image(s) obtained at time(s) t+Δt. As described above, this step is performed for each of multiple installations of the present imaging system if so employed. The background signal removal helps in establishing small changes that can occur due to temperature changes. The change in signal after background removal can be associated with a change(s) in system temperature, such as a temperature increase and/or a temperature drop (i.e., with respect to surrounding temperatures). In one such exemplary implementation where the present imaging system is being employed to monitor a solar installation (such as that configuration shown in FIGS. 5A and 5B, described above), local heating and/or cooling are due to defective solar panel operation or shadowing, respectively, that would result in increased temperatures and/or temperature drops (i.e., with respect to the temperatures of surrounding solar panels that are not defective and/or not experiencing shadowing). The objects being monitored in this example would be the solar panels, and the subtracting step (step 806) would be performed to identify those objects (those solar panels) which experience a change (increase, e.g., due to malfunction and/or decrease, e.g., due to shadowing) in temperature over time.

As a result of performing the subtracting step 806, an identification can be made of the objects (within the field of view) which exhibit a change in temperature between the time t and the time(s) t+Δt. It is notable that thermal changes in the area being monitored can change over time and/or can change intermittently. By way of example only, in the context of solar panel monitoring, additional panels may become defective over time. Further, intermittent cloud cover can cause intermittent temperature drops for some or all of the panels in an installation. In the context of wild fires, the fires can spread resulting in additional hotspots, or efforts to extinguish the fires can result in fewer hotspots over time. The progression of these events can be monitored using the present imaging system in accordance with the process provided in FIG. 8. According to an exemplary embodiment, the images obtained from the present imaging systems can be processed in real time to track changes that occurs intermittently like shading due to clouds covering the sun and/or progressive events like the existence of additional defective panels or the progression of a wild fire. Tracking cloud cover in photovoltaic applications is the primary reason for solar radiation variation. If a cloud covers the sun, the solar radiation decrease and the power produced by the solar panel will also decrease. The amount of change in solar radiation is directly controlled by the type of clouds present, e.g., thick gray clouds will block most of the radiation while thin transparent clouds will allow some radiation to pass. The cloud temperature will be determined by the amount of water that is absorbed in the clouds and the temperature of the atmosphere in that location. What is not known is the size of water droplets in the clouds. Based on the droplet size and their concentration, the sun's radiation will be scattered and only a certain wavelength and amount will be passed through the clouds. That wavelength and amount will determine the solar radiation on the ground and implicitly the power produced by the solar panel.

To identify the clouds and their "color" is advantageous to have images acquired at different wavelength and different amplitude. To discriminate features that are similar as the background, images acquired at different wavelength can enhance the features and separate them from the background.

Thus, by comparing the consecutive image(s) taken at the times t+Δt with the reference image taken at time t, the progression of the temperature changes of the objects over time can be detected. The advantage of using the reference image is that the objects for which a temperature change is not exhibited can be removed from consideration, thus highlighting only those areas needing attention (e.g., those solar panels that are malfunctioning and potentially needing repair).

The change in temperatures as obtained by the present imaging system can be correlated with solar power production for a computer based self learning process to quantify how temperatures and/or shading affect power production. For instance, pinpointing the panels that have higher temperatures and their density can be correlated with power production from inverters that are converting DC to AC power. Solar panels are tied into a serial/parallel configuration to achieve maximum operating points for the AC/DC converters. If a certain converter connected to similar strings of solar panels indicates a lower than expected power output, the defect should be located within that group that is associated with the AC/DC converter. In such a situation it becomes important to adjust remotely the setpoint of the AC/DC converter to increase the performance by automatically coupling or decoupling solar panel strings in the field. This can be achieved by using relays that allow current to flow through certain paths in the strings of solar panels and the path can be adjusted based on the feedback from the solar panel system where defective panels can be avoided from being coupled into power production. Furthermore the images can be used to focus in on panels that are overheating and to monitor their long term performance. In situations where panels should be replaced, the imaging system can help to pinpoint their location and direct technicians to find them easily in the field and replace them to improve system performance.

It is notable that in the current state of the art, localization of panels that are underperforming is challenging as the only measured parameters are the performance on inverters to which the panels are hooked up. Determining which panels are underperforming cannot be done using current practices and the present techniques would help streamline this process.

According to an exemplary embodiment, the steps of methodology 800 are performed in an automated manner by the computer system mentioned above and described in conjunction with the description of FIG. 10, below. Namely, the computer system is able to obtain the image date from the present imaging system and process the image data (e.g., in real-time).

Figure 9:
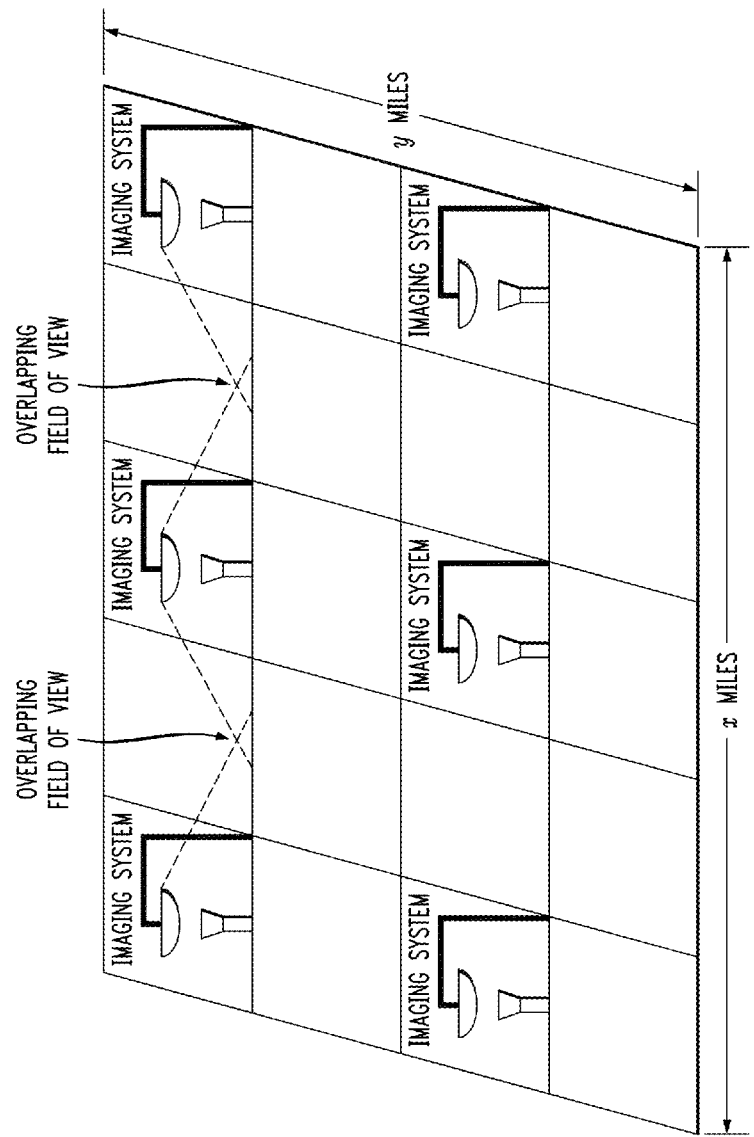
FIG. 9 is a schematic diagram illustrating an imaging network having multiple installations of the present imaging system arranged in a grid format with overlapping fields of view to extend coverage area according to an embodiment of the present invention.

As highlighted above, in order to extend the field of view of the imaging system (for example, for very large solar installations or to monitor wild fires occurring over many acres) deployment of multiple installations of the present imaging system over an extended geographical area positioned on a grid can be employed, forming an imaging network. See FIG. 9. For illustrative purposes only, the present exemplary imaging system having a camera and hemispherical mirror is shown in FIG. 9. This is only an example. Use of the present imaging system outfitted with a camera and fisheye lens may be employed instead of, or in combination with, the hemispherical mirror units shown.

In the example shown in FIG. 9, the grid extends over x and y miles wherein x and y are greater than the field of view FOV of any one individual imaging system used in the grid. Further, as shown in FIG. 9, in order to be able to correlate the images obtained from the multiple systems, it is preferable that the grid is set up such that the systems have overlapping field of view FOV to achieve a larger coverage. The imaging system is used to eliminate blind spots and extend the covered area. Through common landmark points in individual images and an overlap of the field of view, images can be obtained to cover a large geographical area. For example, since the systems have overlapping fields of view, then one or more objects (e.g., land marks) will be present in two (or more) of the images. The positioning of these objects (see description of FIGS. 5A and 5B above regarding each object in the images having unique positioning coordinates) can then be used to orient the multiple images relative to one another. To use a simple example, suppose two installations of the present imaging system were employed (with overlapping FOV), called A and B. An object o is present in the field of view of both systems A and B (i.e., object o is in the overlapping fields of view). Thus, object o would be in both the image obtained from system A and that from system B. Object o has unique positioning coordinates. Thus, the images from system A and from system B can be stitched together based on the positing coordinates of object o which is in both images. The final images would be a combination of individual images stitched together to reconstruct a large area. The images can be processed according to the steps outlined in FIG. 8, and described in detail above in conjunction with the description of methodology 800.

The same distributed network of imaging systems as shown in FIG. 5 can be used to cover a large area(s) to monitor fires during daytime and nighttime. Bush fires that occur during dry season (commonly encountered in Australia) can lead to human life lost and considerable economic damages. The present imaging system can be used to detect local heat sources and through image processing assess the locations and extents of the fires. As described above, the monitoring and image processing can be performed in real time, allowing one to track progression of the fires and the efforts to extinguish them. For instance, an image of the area taken (by way of the present imaging system) at a time "t" can used as a reference and to survey the extent of the fire. As the fire and/or the efforts to extinguish the fire progress, consecutive images may be obtained at a later time "t+$\Delta$t." The image taken at time t can be subtracted from consecutive images recorded at a later time. This will reveal the progression of the fire.

The present imaging system, either singularly or as a distributed network of imaging systems as shown in FIG. 5, can be used for presence detection over an extended area or surveillance tracking where the infrared signal emitted by building occupants can be tracked remotely. For instance, people who are occupying a building are acting as heat sources. Estimating the amount of heat that people generate can provide a means to adjust locally the cooling necessary to maintain the local temperatures. Thus, in the manner described above, the present system and techniques for use thereof can be used to monitor any type of heat source whether it be from photovoltaic installations, crop temperatures in agricultural fields, wildfires, buildings (such as data centers where the present system/techniques can be used to monitor the data center temperatures), etc.

Figure 10:
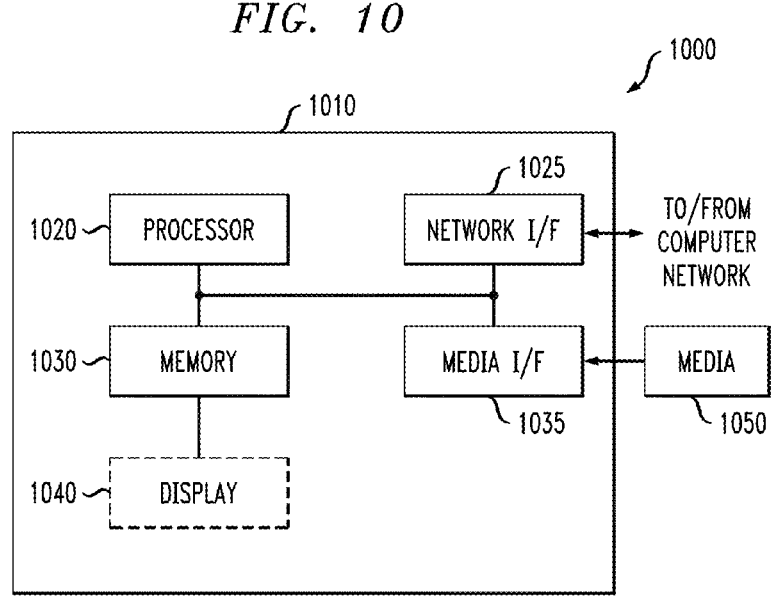
FIG. 10 is a diagram illustrating an exemplary apparatus for thermal monitoring using the present imaging system according to an embodiment of the present invention.

Turning now to FIG. 10, a block diagram is shown of an apparatus 1000 for thermal monitoring using the present imaging system, in accordance with one embodiment of the present invention. It should be understood that apparatus 1000 represents one embodiment for implementing methodology 800 of FIG. 8, described above. Namely, as described above, the steps of methodology 800 may be performed in an automated manner by apparatus 1000, i.e., the computer system is able to obtain the image date from the present imaging system and process the image data (e.g., in real time). It is preferable that apparatus 1000 has network connectivity with the present imaging system(s) in a given installation and performs remote monitoring and data analysis functions. Further, as described above, when spectral filtering is used during image acquisition, the filter selection may be controlled by apparatus 1000 in a remote and automated manner (i.e., as compared to having a technician manually change the filter present in front of the camera).

Apparatus 1000 includes a computer system 1010 and removable media 1050. Computer system 1010 includes a processor device 1020, a network interface 1025, a memory 1030, a media interface 1035 and an optional display 1040. Network interface 1025 allows computer system 1010 to connect to a network, while media interface 1035 allows computer system 1010 to interact with media, such as a hard drive or removable media 1050.

As is known in the art, the methods and apparatus discussed herein may be distributed as an article of manufacture that itself comprises a machine-readable medium containing one or more programs which when executed implement embodiments of the present invention. For instance, the machine-readable medium may contain a program configured to obtain a reference image of a geographical area at a time t using at least one imaging system, the imaging system comprising a camera equipped with curved optics having a field of view of from about 0.01 miles to about 1.5 miles and interchangeable light filters positioned in front of the camera configured to change one or more of an intensity and an amplitude of light captured by the imaging system; obtain one or more consecutive images of the geographical area at one or more times t+Δt using the at least one imaging system; and subtract the reference image from the one or more consecutive images to identify one or more of the objects which exhibit a change in temperature between the time t and the one or more times t+Δt.

The machine-readable medium may be a recordable medium (e.g., floppy disks, hard drive, optical disks such as removable media 1050, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor device 1020 can be configured to implement the methods, steps, and functions disclosed herein. The memory 1030 could be distributed or local and the processor device 1020 could be distributed or singular. The memory 1030 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1020. With this definition, information on a network, accessible through network interface 1025, is still within memory 1030 because the processor device 1020 can retrieve the information from the network. It should be noted that each distributed processor that makes up processor device 1020 generally contains its own addressable memory space. It should also be noted that some or all of computer system 1010 can be incorporated into an application-specific or general-use integrated circuit.

Optional video display 1040 is any type of video display suitable for interacting with a human user of apparatus 1000. Generally, video display 1040 is a computer monitor or other similar video display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for thermal monitoring, comprising the steps of:
obtaining an infrared reference image of a geographical area at a time t using at least one imaging system, the imaging system comprising an infrared thermographic camera equipped with curved optics having a field of view of from about 0.01 miles to about 1.5 miles and interchangeable light filters positioned in front of the infrared thermographic camera configured to change one or more of an intensity and an amplitude of light captured by the imaging system, wherein at least one of the interchangeable light filters is tailored for wavelengths of light in an infrared light spectrum, and wherein the interchangeable light filters are selected such that a transmission window of light that can pass through each of the interchangeable light filters does not overlap among the interchangeable light filters;
obtaining consecutive infrared images of a region of the geographical area equal in size to the field of view at one or more times t+Δt using the at least one imaging system, wherein one or more of the intensity and the amplitude of light captured by the imaging system is changed via the interchangeable light filters each time one of the consecutive infrared images is obtained; and
subtracting the infrared reference image from the consecutive infrared images to identify one or more of the objects which exhibit a change in temperature between the time t and the one or more times t+Δt.

2. The method of claim 1, wherein the infrared reference image and the consecutive infrared images obtained by the imaging system are spherical images, the method further comprising the step of:
unfolding the infrared reference image and the consecutive infrared images from a spherical coordinate system to a flat Cartesian image.

3. The method of claim 1, wherein the curved optics comprise a hemispherical mirror configured to reflect an image of objects in front of the mirror, and wherein the infrared thermographic camera is positioned facing a reflective surface of the hemispherical mirror and is configured to capture the image reflected in the hemispherical mirror.

4. The method of claim 1, wherein the curved optics comprise a fisheye lens mounted to the infrared thermographic camera.

5. The method of claim 1, wherein the infrared thermographic camera is sensitive to light in near to mid infrared ranges and is configured to detect temperature changes of from about 0.1° C. to about 2° C.

6. The method of claim 1, wherein multiple imaging systems are positioned in the geographical area forming an imaging network, the method further comprising the steps of:
obtaining the infrared reference image of the geographical area at the time t using the imaging network; and
obtaining the consecutive infrared images of the geographical area at the one or more times t+Δt using the imaging network.

7. The method of claim 6, wherein the imaging systems are positioned in the geographical area on a grid to form an imaging network, and wherein the imaging systems are positioned on the grid so as to have overlapping fields of view.

8. The method of claim 1, wherein the interchangeable light filters are mounted on a circular carrier that is positioned in front of the infrared thermographic camera, the method further comprising the step of:
rotating the circular carrier in a carousel fashion clockwise or counterclockwise to position a different one of the interchangeable light filters in front of the infrared thermographic camera.

9. The method of claim 8, further comprising the step of:
obtaining the consecutive infrared images using each of the interchangeable light filters on the circular carrier in succession.

10. The method of claim 1, wherein at least one of the consecutive infrared images is obtained at night.

* * * * *